(12) United States Patent
Tani et al.

(10) Patent No.: US 6,812,964 B1
(45) Date of Patent: Nov. 2, 2004

(54) THREE-DIMENSIONAL IMAGE CAPTURING DEVICE

(75) Inventors: Nobuhiro Tani, Tokyo (JP); Shuzo Seo, Saitama (JP); Shinichi Kakiuchi, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 09/547,908

(22) Filed: Apr. 11, 2000

(30) Foreign Application Priority Data

Apr. 13, 1999 (JP) ............................................ 11-105450

(51) Int. Cl.[7] ....................... H04N 5/335; H04N 5/222; G01C 3/08
(52) U.S. Cl. ....................... 348/296; 348/370; 356/5.01
(58) Field of Search ............................. 348/296, 207.1, 348/320, 322, 323, 312, 314, 348, 370; 396/120; 356/5.01

(56) References Cited

U.S. PATENT DOCUMENTS

| | | | |
|---|---|---|---|
| 4,686,572 A | | 8/1987 | Takatsu |
| 5,081,530 A | | 1/1992 | Medina |
| 5,122,850 A | * | 6/1992 | Burkey ........................ 257/230 |
| 5,424,223 A | * | 6/1995 | Hynecek ..................... 438/59 |
| 5,808,726 A | * | 9/1998 | Egawa et al. ............... 356/3.06 |
| 6,097,022 A | * | 8/2000 | Merrill et al. ............ 250/208.1 |
| 6,100,517 A | * | 8/2000 | Yahav et al. ............. 250/208.1 |
| 6,628,335 B1 | * | 9/2003 | Numazaki et al. ........... 348/370 |
| 6,721,007 B1 | * | 4/2004 | Tani et al. ................... 348/296 |

FOREIGN PATENT DOCUMENTS

| | | |
|---|---|---|
| JP | 4-351074 | 12/1992 |
| WO | 97/01111 | 1/1997 |

OTHER PUBLICATIONS

*Design and Development of a Multi–Detecting Two–Dimensional Ranging Sensor*, by Christie et al., *Measurement of Science and Technology*, 6 (1995), pp. 1301–1308.

* cited by examiner

*Primary Examiner*—Wendy R. Garber
*Assistant Examiner*—Timothy J. Henn
(74) *Attorney, Agent, or Firm*—Greenblum & Bernstein, P.L.C.

(57) ABSTRACT

A three-dimensional image capturing device comprises an imaging device, such as a CCD, having a plurality of photo-diodes, a vertical transfer unit and a substrate. An electric charge discharging signal and an electric charge transfer signal are periodically output, respectively. Due to the electric charge discharging signal, unwanted charge accumulated in the photo-diodes is discharged to the substrate. A distance measuring light beam is radiated on a measurement subject, and a reflected light beam from the measurement subject is sensed by the CCD, so that electric charge, corresponding to distance information from the device to the measurement subject, is accumulated in the photo-diodes. The electric charge is transferred to a vertical transfer unit due to the electric charge transfer signal. By starting an output of the electric charge transfer signal at the same time as the end of the output of the electric charge discharging signal, electric charge accumulated in the photo-diodes in the transfer operation is sensed to correct the distance information obtained by the CCD.

8 Claims, 13 Drawing Sheets

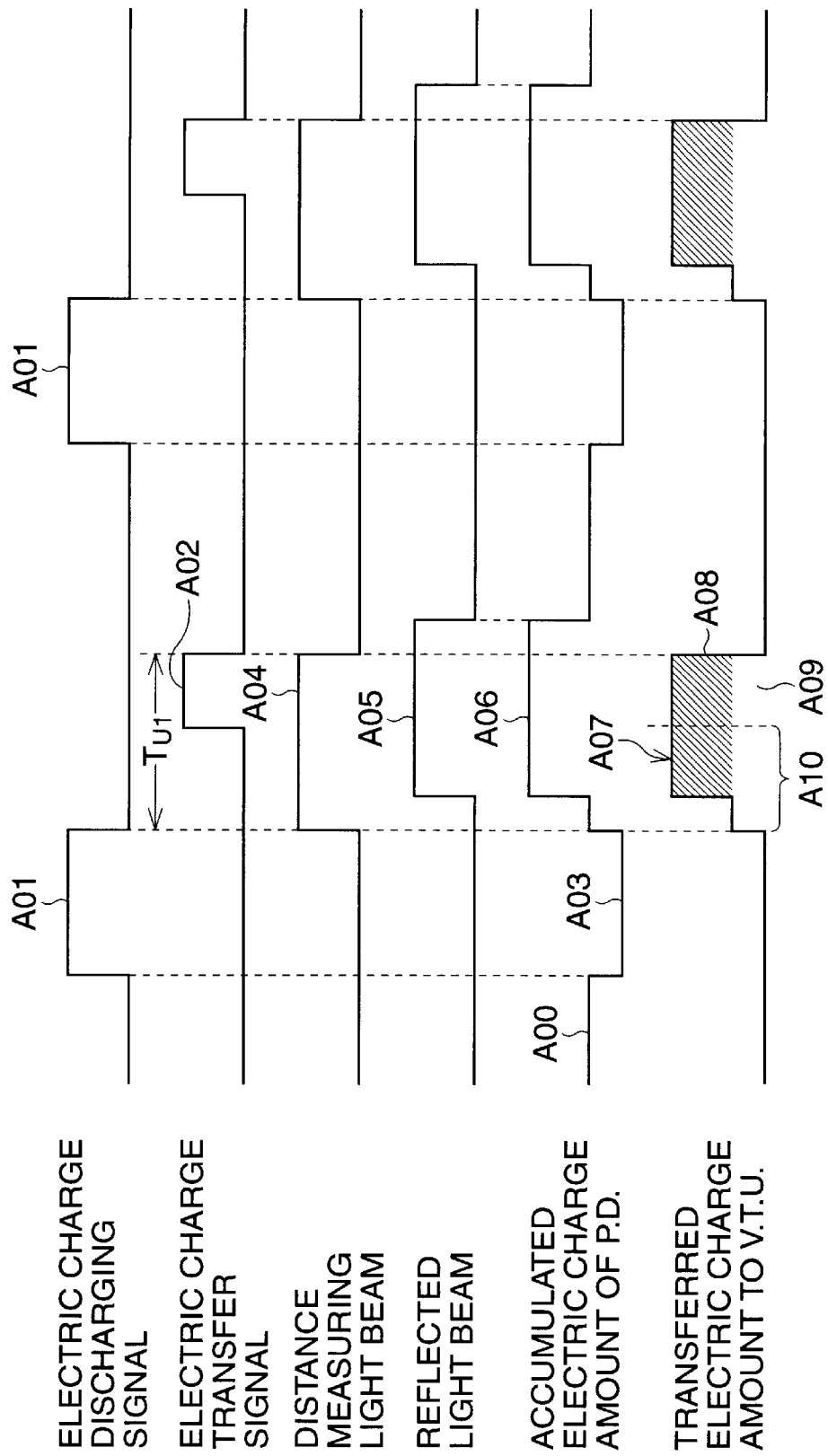

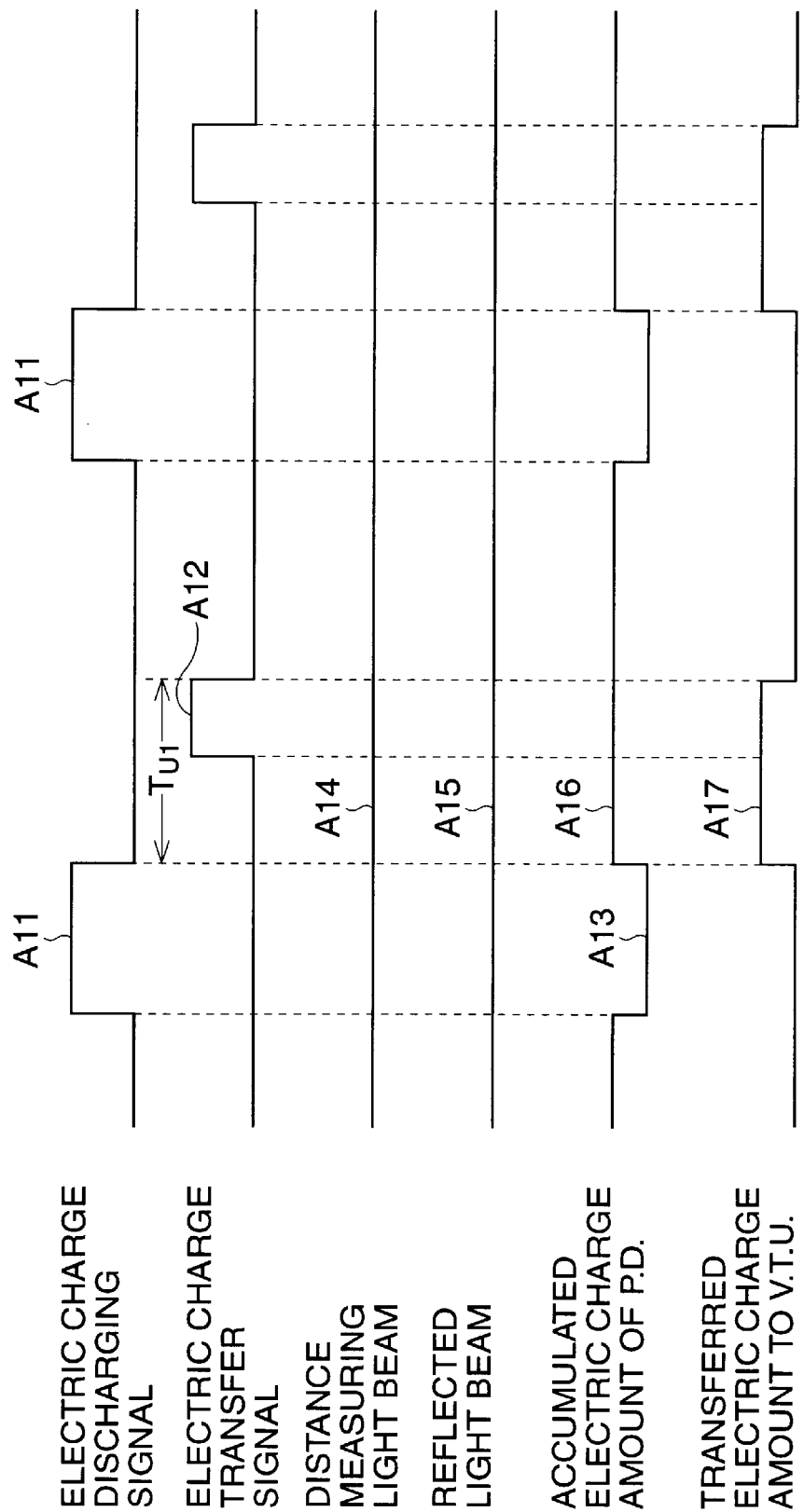

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, or a passive system in which the light, electric wave or sound is not output. The active system comprises the time-of-flight measurement, a phase detection using a modulated light wave, a triangulation, a moire topography, and so on, and the passive system comprises a stereo vision system, and so on.

An active system device is bulky in comparison with that of the passive system, since the device requires a laser beam output mechanism. However, the active system device is superior regarding a distance measurement resolution, a measuring time, a measuring range and so on, and thus, despite its bulkiness, the device is utilized in various fields. In a three-dimensional image capturing device, described in "Measurement Science and Technology" (S. Christies et al., vol.6, p.1301–1308, 1995), a pulse-modulated laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from a measurement subject, which is positioned far from the device, is less than that of received light based on a reflected light beam from a measurement subject, which is close to the device, an output corresponding to a distance between the measurement subject and the device can be obtained for each pixel of the CCD.

In a device disclosed in International Publication No. WO 97/01111, light, such as a laser beam, which is pulse-modulated, irradiates a measurement subject, and a reflected light beam, which is reflected by the measurement subject, is received by a two-dimensional CCD sensor which is assembled with a mechanical shutter or an electro-optical shutter formed by a liquid crystal display, so that an image signal corresponding to the reflected light beam is converted to an electric signal. The shutter is controlled at a timing which is different from that of the laser beam, so that distance information of the measurement subject is obtained for each pixel of the CCD.

In the conventional three-dimensional image capturing device of an active system described above, an optical shutter, such as a KDP element, is provided so that an electric charge accumulating operation in the CCD sensor is controlled. However, not only is the optical shutter bulky, but also an electric circuit, which outputs a high voltage to drive the optical shutter, should be provided, and thus the conventional device becomes and remains bulky.

On the other hand, in U.S. Pat. No. 5,081,530, a device, in which an electronic shutter is provided for controlling an electric charge accumulating operation of a CCD sensor, is disclosed. However, an output of the CCD sensor, which is obtained by a single operation of the electronic shutter, is not great enough to sense distance information of the measurement subject.

SUMMARY OF THE INVENTION

Therefore, an object of the present invention is to provide a miniaturized three-dimensional image capturing device, which operates without an optical shutter, and by which an output sufficient to acquire three-dimensional distance information of the measurement subject is obtainable.

According to the present invention, there is provided a three-dimensional image capturing device, comprising a light source, a plurality of photoelectric conversion elements, a signal charge holding unit, an electric charge discharging processor, a signal charge transfer processor, a distance information sensing processor, an error information sensing processor and a distance information calculation processor.

The light source radiates a distance measuring light beam irradiating a measurement subject. The measurement subject reflects the distance measuring light beam to generate a reflected light beam. The plurality of photoelectric conversion elements receive the reflected light beam, so that electric charge corresponding to an amount of the received reflected light beam is accumulated in each of the photoelectric conversion elements. The signal charge holding unit is disposed adjacent to each of the photoelectric conversion elements. The electric charge discharging processor discharges unwanted charge accumulated in each of the photoelectric conversion elements, so that an accumulating operation of signal charge is started in each of the photoelectric conversion elements. The signal charge transfer processor transfers the signal charge accumulated in the photoelectric conversion elements to the signal charge holding unit. The distance information sensing processor controls the light source, the electric charge discharging processor and the signal charge transfer processor in such a manner that the photoelectric conversion elements receive the reflected light beam after the completion of a discharging operation of the electric charge discharging processor, and controls a transfer operation of the signal charge transfer processor, so that the signal charge is integrated in the signal charge holding unit to sense first distance information corresponding to a distance to the measurement subject. The error information sensing processor controls the light source, the electric charge discharging processor and the signal charge transfer processor in such a manner that the photoelectric conversion elements start to receive the reflected light beam before the completion of the discharging operation, and controls a transfer operation of the signal charge transfer processor, so that the signal charge is integrated in the signal charge holding unit to sense error information generated in the photoelectric conversion elements during the transfer operation. The distance information calculation processor subtracts the error information from the first distance information to obtain second distance information indicating the distance to the measurement subject.

BRIEF DESCRIPTION OF THE DRAWINGS

The objects and advantages of the present invention will be better understood from the following description, with reference to the accompanying drawings in which:

FIG. 8 is a timing chart of a distance information sensing operation;

FIG. 9 is a timing chart of a distance correction information sensing operation;

DESCRIPTION OF THE PREFERRED EMBODIMENTS

Figure 1:
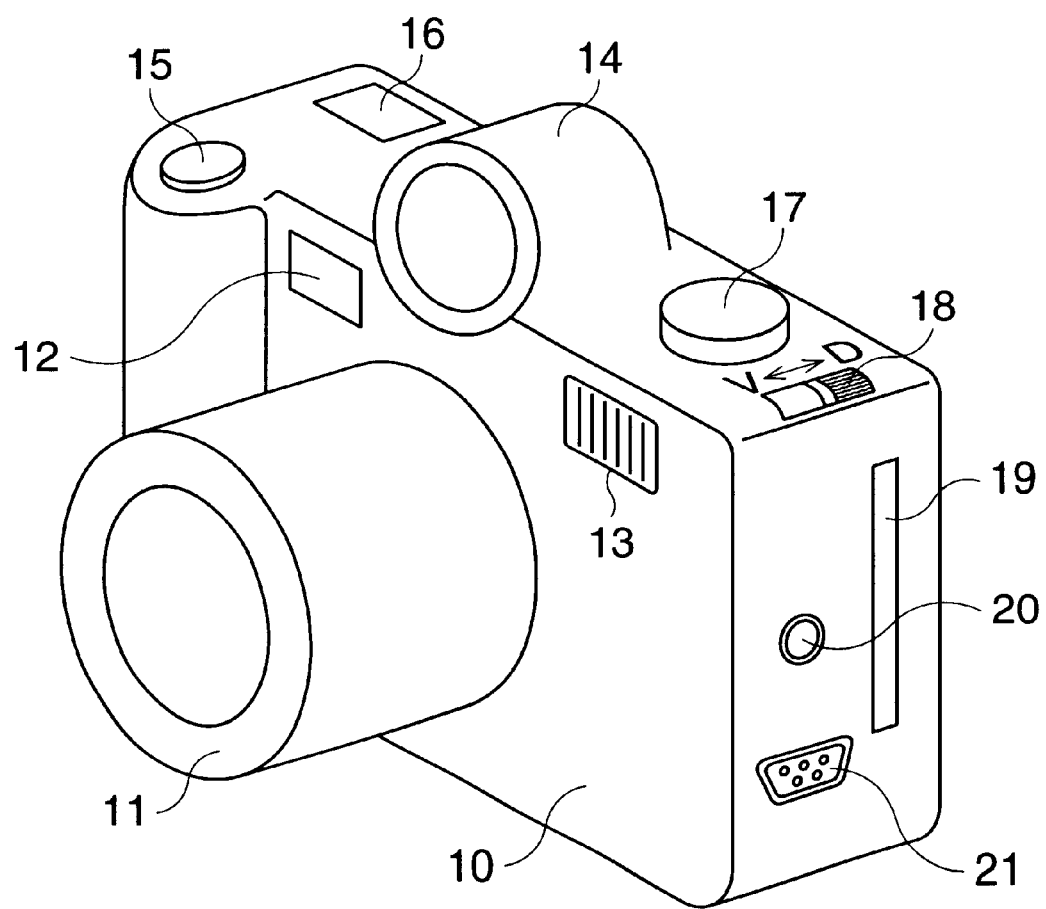
FIG. 1 is a perspective view showing a camera provided with a three-dimensional image capturing device of an embodiment of the present invention.

The present invention will be described below with reference to embodiments shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
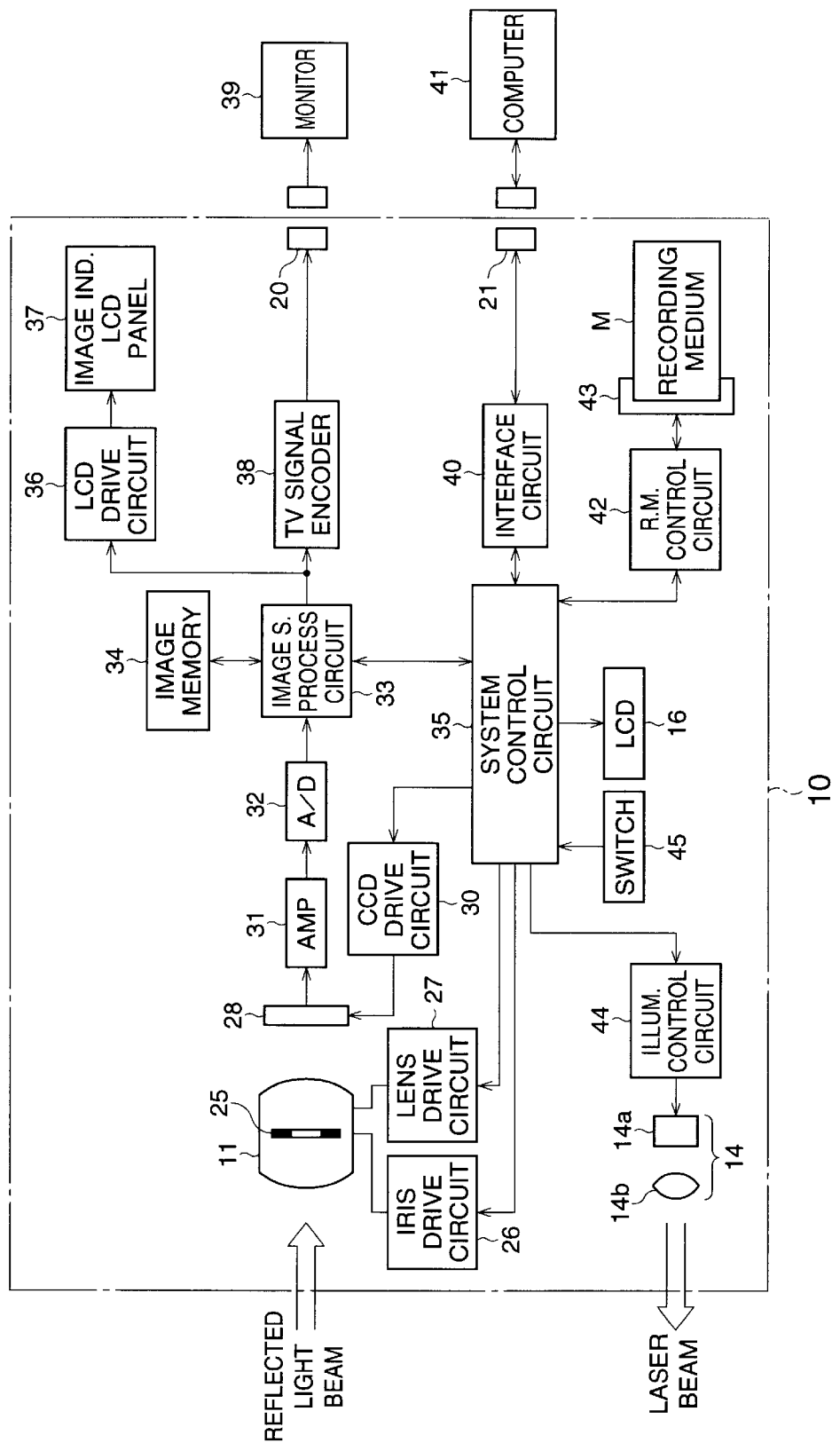
FIG. 2 is a block diagram showing an electrical construction of the camera shown in FIG. 1.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in a image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A luminous-flux emitting element control circuit 44 is connected to the system control circuit 35. The light emitting device 14 is provided with a luminous-flux emitting element 14a and an illumination lens 14b, and an operation of the luminous-flux emitting element 14a is controlled by the luminous-flux emitting element control circuit 44. The luminous-flux emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control, including a timing control of a transferring operation of the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35.

Figure 3:
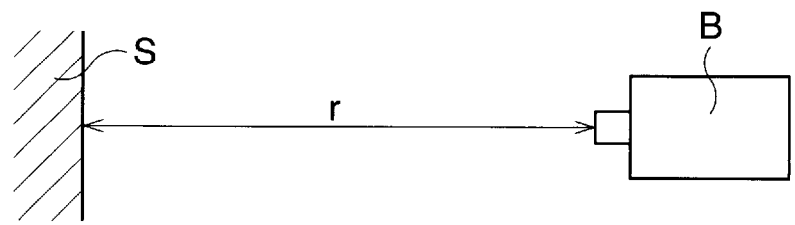
FIG. 3 is a view showing a principle behind a distance measurement.
Figure 4:
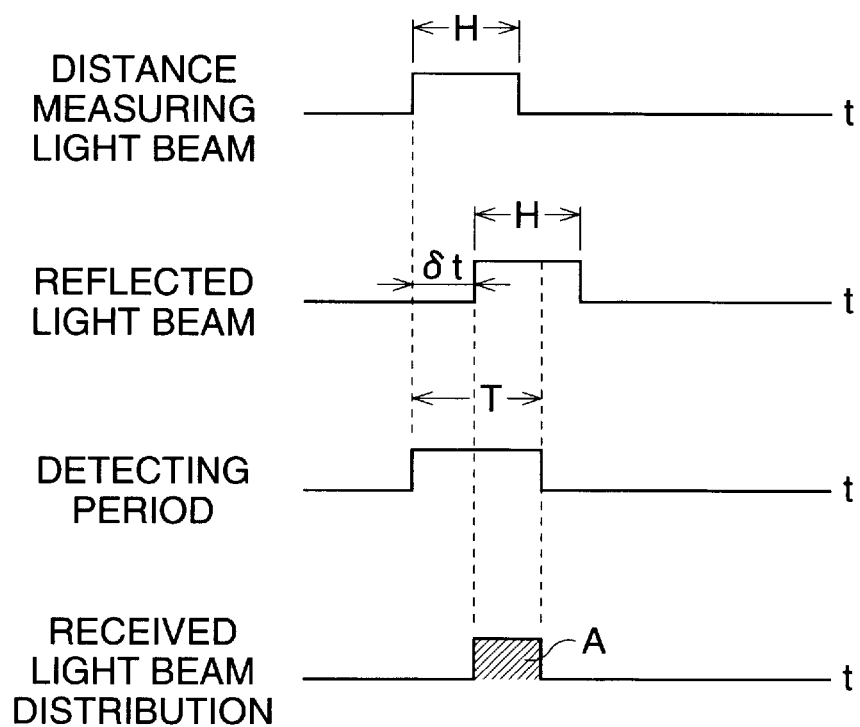
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot r \cdot C/2 \quad (1)$$

wherein "C" is the velocity of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
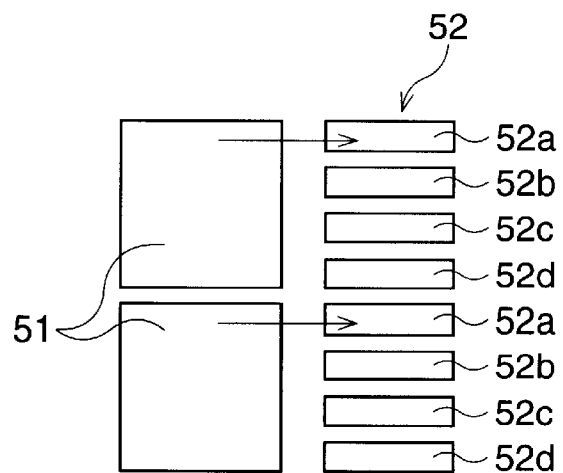
FIG. 5 is a plan view showing a disposition of photo-diodes and a vertical transfer unit, which are provided in the CCD.
Figure 6:
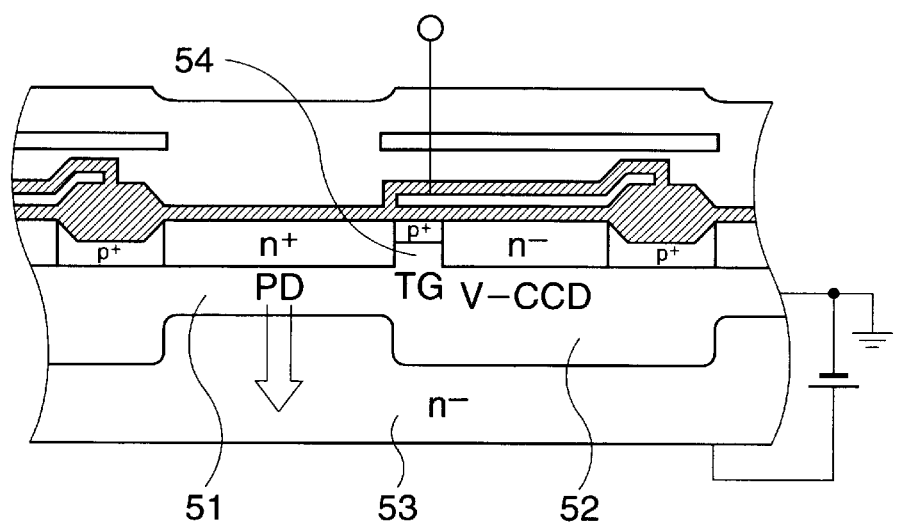
FIG. 6 is a sectioned elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 7A:
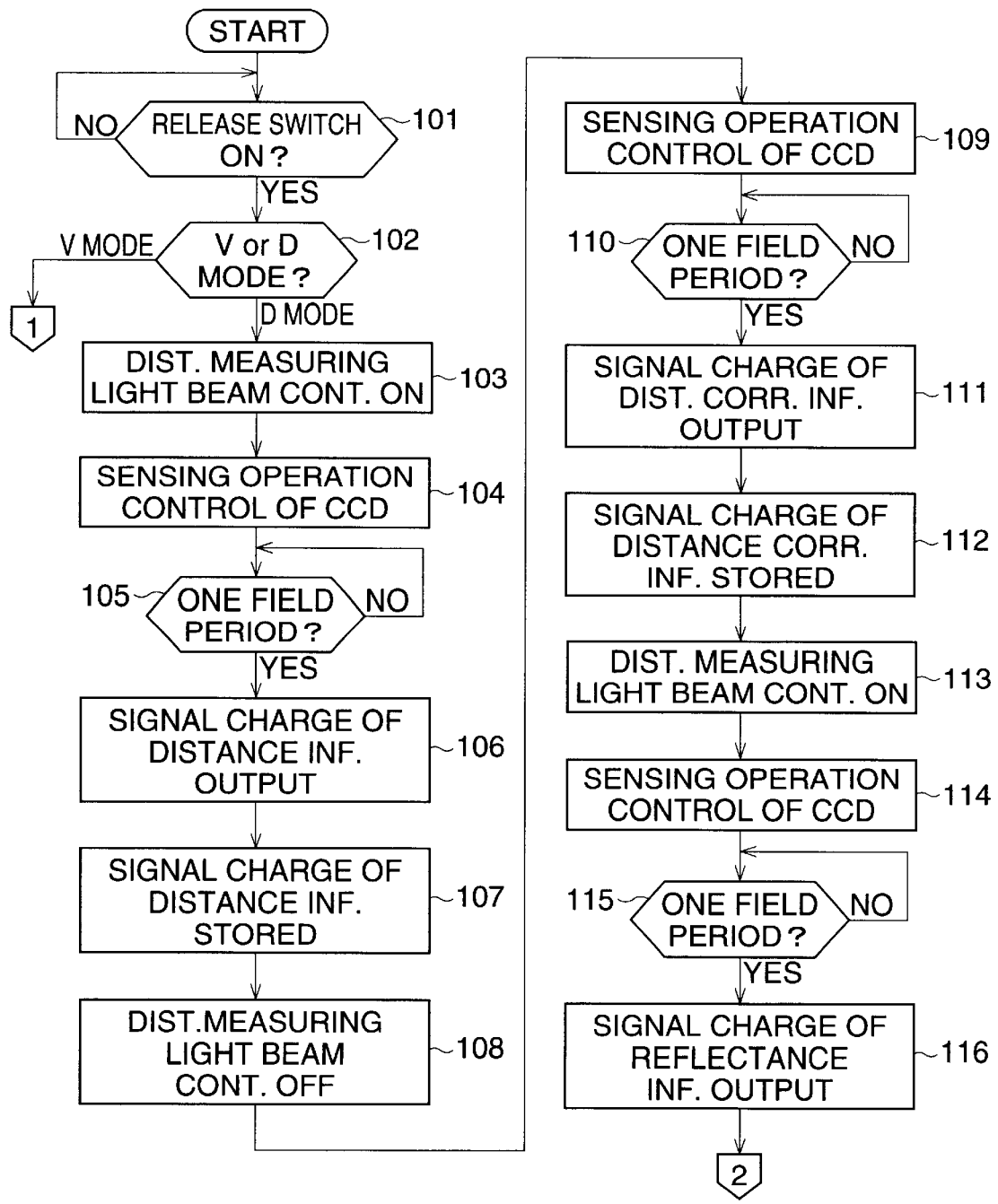
FIGS. 7A, 7B and 7C show a flowchart of a distance information sensing operation in which distance information, distance correction information, reflectance information, reflectance correction information, error information and error correction information are sensed.
Figure 7B:
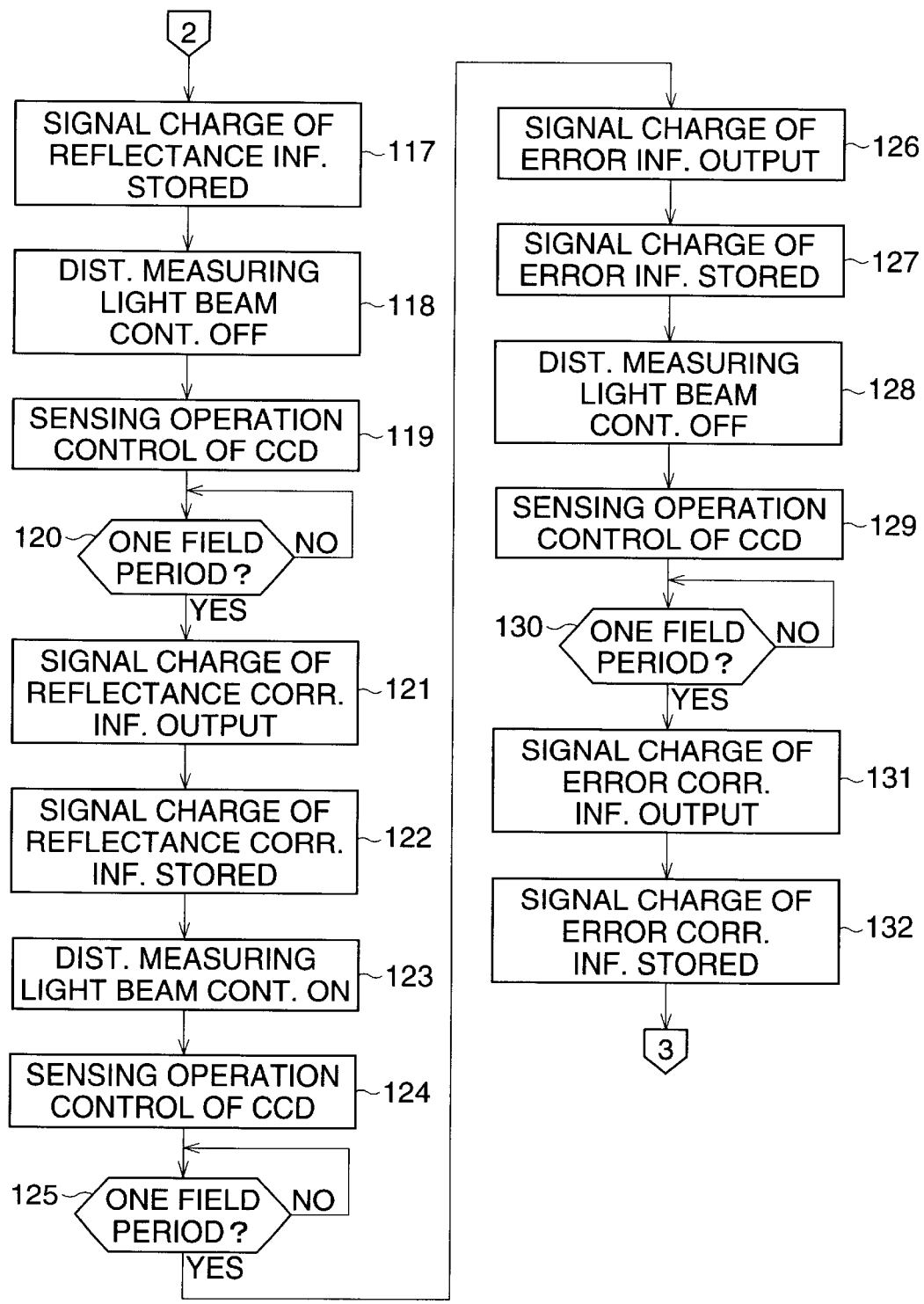
Figure 7C:
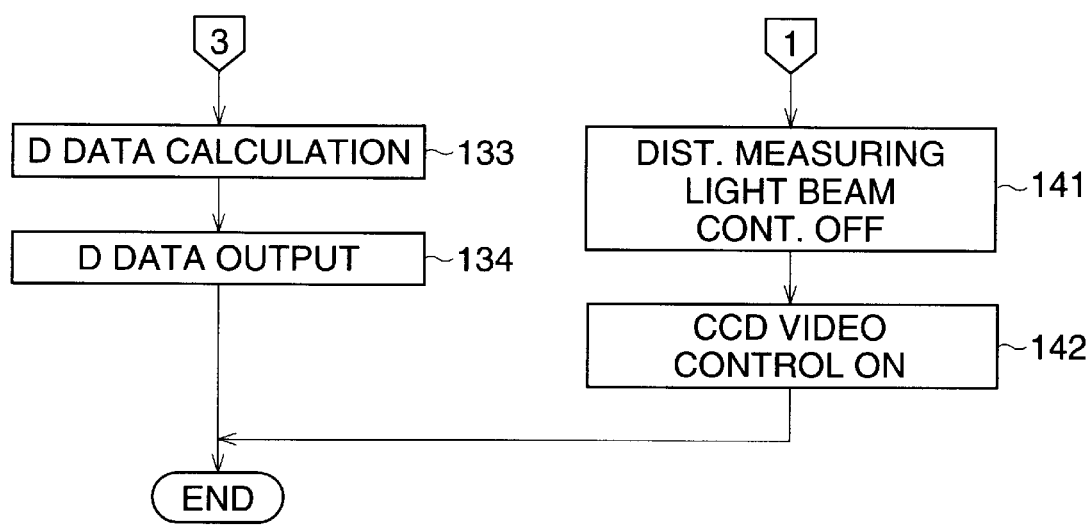

FIGS. 7A, 7B and 7C show a flowchart of a sensing operation by which data of the three-dimensional image regarding a surface shape of the measurement subject is sensed. FIGS. 8 through 13 are timing charts of the sensing operation. With reference to FIGS. 1, 2, 7A, 7B, and 7C, 8 through 13, an operation of the embodiment is described below.

When it is recognized in Step 101 that the release switch 15 is fully depressed, Step 102 is executed in which it is determined which mode is selected, a video (V) mode or a distance measurement (D) mode. A change between the modes is carried out by operating the V/D mode switch 18.

When the D mode is selected, Step 103 and Steps following Step 103 are executed, and the distance information sensing operation shown in FIG. 8 is performed in Steps 103 through 107.

In Step 103, a distance measuring light beam control is started, so that a distance measuring light beam A04 is periodically output. In Step 104, a vertical synchronizing signal (not shown) is output, and then, an electric charge discharging signal (a pulse signal) A01 and an electric charge transfer signal (a pulse signal) A02 are periodically output, respectively.

Due to the electric charge discharging signal A01, unwanted charge A00, which is accumulated in the photo-diodes 51, is discharged to the substrate 53, so that the electric charge accumulating amount A03 becomes zero. The light emitting device 14 is actuated at the same time as when the output of the electric charge discharging signal A01 ends, so that a distance measuring light beam A04 having a constant pulse width is output. The distance measuring light beam A04 is reflected by the measurement subject and enters the CCD 28, so that a reflected light beam A05 from the measurement subject is received by the CCD 28. When a predetermined time has passed after the end of the completion of the distance measuring light beam A04, the electric charge transfer signal A02 is output. The output of the electric charge transfer signal A02 is completed by the time the reflected light beam A05 disappears.

In the photo-diodes 51, electric charge is accumulated due to the reflected light beam A05 and an interference or noise component such as ambient daylight (reference A06), and the accumulated electric charge is transferred to the vertical transfer unit 52 in accordance with the electric charge transfer signal A02. The electric charge amount A07 transferred to the vertical transfer unit 52 is the amount of electric charge accumulated in each of the photo-diodes 51 in a period $T_{U1}$ from the end of the discharging operation, by which unwanted charge is discharged by the electric charge discharging signal A01, to the end of the transfer operation by the electric charge transfer signal A02, and contains electric charge (reference A08, hatched portion) corresponding to a distance from the camera body to the measurement subject and electric charge (reference A09, unhatched portion) which occurs based on the interference or noise.

After a predetermined time has passed since the end of the output of the electric charge transfer signal A02, the electric charge discharging signal A01 is again output, so that unwanted charge, accumulated in the photo-diodes 51 after the transfer of the signal charges to the vertical transfer unit 52, is discharged to the substrate 53. Namely, accumulation of signal charge in each of the photo-diodes 51 is newly started. Then, in a similar way as described above, when the electric charge accumulating period $T_{U1}$ has passed, the signal charge is transferred to the vertical transfer unit 52.

The transferring operation of the signal charge A07 to the vertical transfer unit 52 is repeatedly performed until the next vertical synchronizing signal is output. Thus, the signal charge A07 is integrated in the vertical transfer unit 52. The signal charge A07 integrated for one field period, which is between two vertical synchronizing signals, corresponds to distance information of the measurement subject, on the condition that the measurement subject is stationary for the period between the two vertical synchronizing signals.

In Step 105, it is determined whether one field period has elapsed since the output of the vertical synchronizing signal in Step 104, i.e., whether a new vertical synchronizing signal has been output. When one field period has passed, the process goes to Step 106 in which the signal charge A07 of the distance information is output from the CCD 28. The signal charge A07 is then stored in the image memory 34 in Step 107. Then, in Step 108, the distance measuring light beam is turned OFF, and thus the light emitting operation of the light emitting device 14 is stopped.

The detecting operation of the signal charge A07 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measured subject.

In Steps 109 through 112, the distance correction information sensing operation, shown in FIG. 9, is performed. In Step 109, a vertical synchronizing signal (not shown) is output, and a sensing operation control of the CCD 28 is started. Namely, an electric charge discharging signal A11 and an electric charge transfer signal A12 are periodically output while the light emitting operation of the light emitting device 14 is not carried out, i.e., while the light source is not illuminated.

The electric charge accumulation period $T_{U1}$ is the same as that of the distance information sensing operation shown in FIG. 8. In the distance correction information sensing operation, however, since the distance measuring light beam is not radiated (reference A14), there is no reflected light beam (reference A15). Therefore, in the photo-diodes 51, after the electric charge amount becomes zero due to the electric charge discharging signal A11 (reference A13), although a signal charge of the distance information is not generated, an interference or noise component, such as ambient daylight, enters each of the photo-diodes 51, and therefore, an electric charge corresponding to the noise component is accumulated (reference A16). The accumulated electric charge, which is a signal charge A17, is transferred to the vertical transfer unit 52 by the electric charge transfer signal A12. Namely, the signal charge A17 corresponds to distance correction information to the electric charge accumulation period $T_{U1}$, by which an influence, in which the noise component affects the distance information, is corrected.

In Step 110, it is determined whether one field period has elapsed since the beginning of the distance correction information sensing operation, i.e., whether a new vertical synchronizing signal has been output. When one field period has passed, the process goes to Step 111 in which the signal charge A17 of the distance correction information is output from the CCD 28. The signal charge A17 is then stored in the image memory 34 in Step 112. Thus, in the distance correction information sensing operation, similarly to the distance information sensing operation, the transferring operation of the signal charge A17 to the vertical transfer unit 52 is repeatedly performed until the next vertical synchronizing signal is output, so that the signal charge A17 is integrated in the vertical transfer unit 52.

Figure 10:
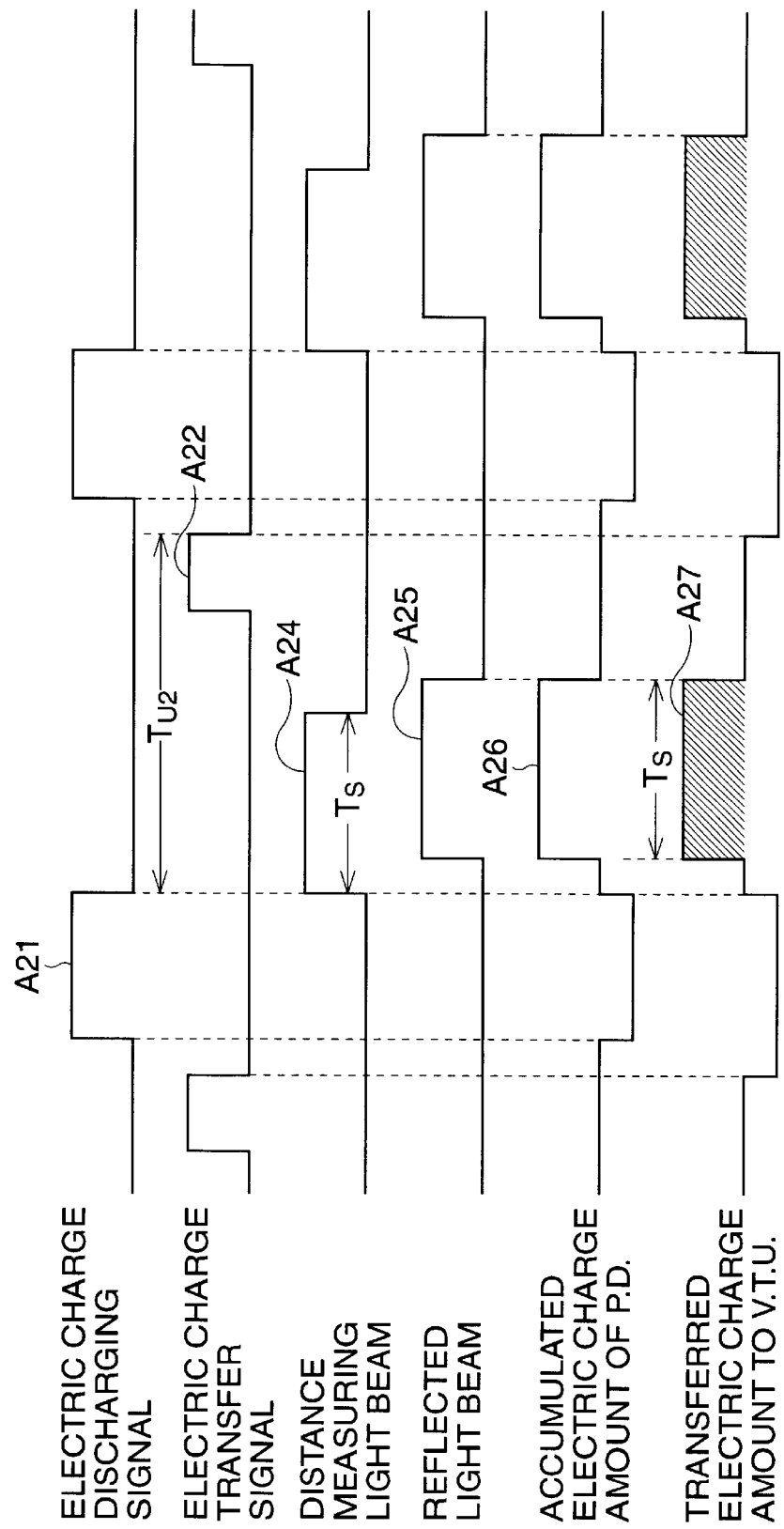
FIG. 10 is a timing chart of a reflectance information sensing operation.

In Steps 113 through 117, the reflectance information sensing operation shown in FIG. 10 is performed. In Step 113, a vertical synchronizing signal (not shown) is output, and a distance measuring light beam control of the CCD 28 is started, so that a distance measuring light beam A24 is intermittently output. In Step 114, a sensing operation control of the CCD 28 is started, and thus an electric charge discharging signal A21 and an electric charge transfer signal A22 are periodically output. The reflectance information sensing operation is performed in such a manner that all of the reflected light beam A25 is received within an electric charge accumulation period $T_{U2}$, which is from an end of an output of the electric charge discharging signal A21 to an end of an output of the electric charge transfer signal A22. Namely, all of the electric charge A26 accumulated in each of the photo-diodes 51 is transferred to the vertical transfer unit 52, and a pulse width $T_S$ of a signal charge A27 transferred to the vertical transfer unit 52 is the same as a pulse width $T_S$ of the distance measuring light beam A24.

Therefore, the signal charge A27 does not depend upon the distance of the measurement subject, and corresponds only to the reflectance information which depends on the reflectance of the surface of the measurement subject.

In Step 115, it is determined whether one field period has elapsed since the beginning of the reflectance information sensing operation, i.e., whether a new vertical synchronizing signal has been output. When one field period has passed, the process goes to Step 116 in which the signal charge A27 of the reflectance information is output from the CCD 28. The signal charge A27 is then stored in the image memory 34 in Step 117. Then, in Step 118, the distance measuring light beam is turned OFF, and thus the light emitting operation of the light emitting device 14 is stopped.

Thus, in the reflectance information sensing operation, similarly to the distance information sensing operation, the transferring operation of the signal charge A27 to the vertical transfer unit 52 is repeatedly performed until the next vertical synchronizing signal is output, so that the signal charge A27 is integrated in the vertical transfer unit 52.

Figure 11:
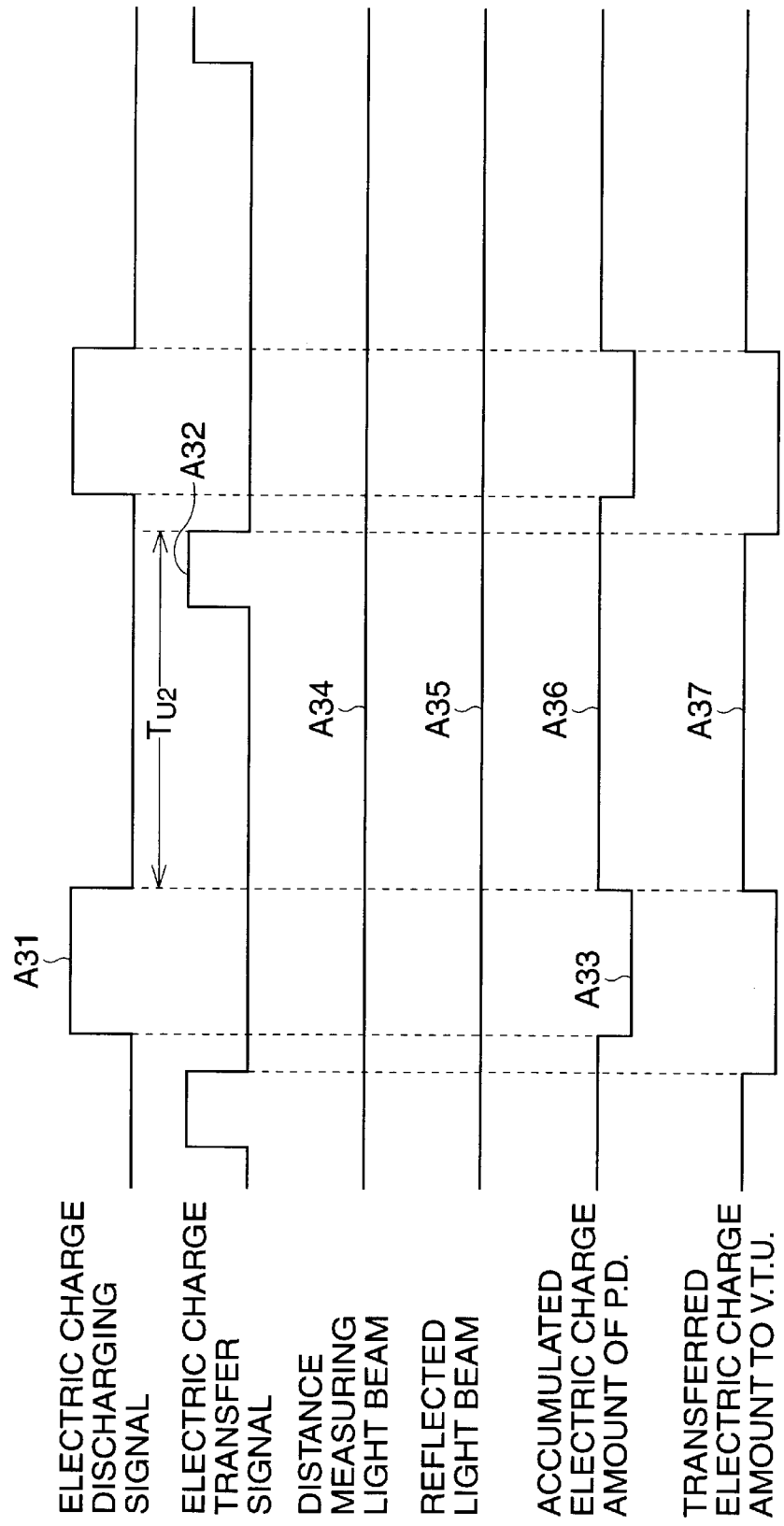
FIG. 11 is a timing chart of a reflectance correction information sensing operation.

In Steps 119 through 122, the reflectance correction information sensing operation shown in FIG. 11 is performed. In Step 119, a vertical synchronizing signal (not shown) is output, and a sensing operation control of the CCD 28 is started. Namely, an electric charge discharging signal A31 and an electric charge transfer signal A32 are periodically output while the light emitting operation of the light emitting device 14 is not carried out.

The electric charge accumulation period $T_{U2}$ is the same as that of the reflectance information sensing operation shown in FIG. 10. In the reflectance correction information sensing operation, however, since the distance measuring light beam is not radiated (reference A34), there is no reflected light beam (reference A35). Therefore, in the photo-diodes 51, after the electric charge amount becomes zero due to the electric charge discharging signal A31 (reference A33), although a signal charge of the distance information is not generated, an electric charge A36 corresponding to an interference or noise component, such as ambient daylight, is accumulated. The accumulated electric charge, which is a signal charge A37, is transferred to the vertical transfer unit 52 by the electric charge transfer signal A32. Namely, the signal charge A37 corresponds to reflectance correction information by which an influence, in which the noise component affects the reflectance information, is corrected.

In Step 120, it is determined whether one field period has elapsed since the beginning of the reflectance correction information sensing operation, i.e., whether a new vertical synchronizing signal has been output. When one field period has passed, the process goes to Step 121 in which the signal charge A37 of the reflectance correction information is output from the CCD 28. The signal charge A37 is stored in the image memory 34 in Step 122.

Thus, in the reflectance correction information sensing operation, similarly to the distance information sensing operation, the transferring operation of the signal charge A37 to the vertical transfer unit 52 is repeatedly performed until the next vertical synchronizing signal is output, so that the signal charge A37 is integrated in the vertical transfer unit 52.

Figure 12:
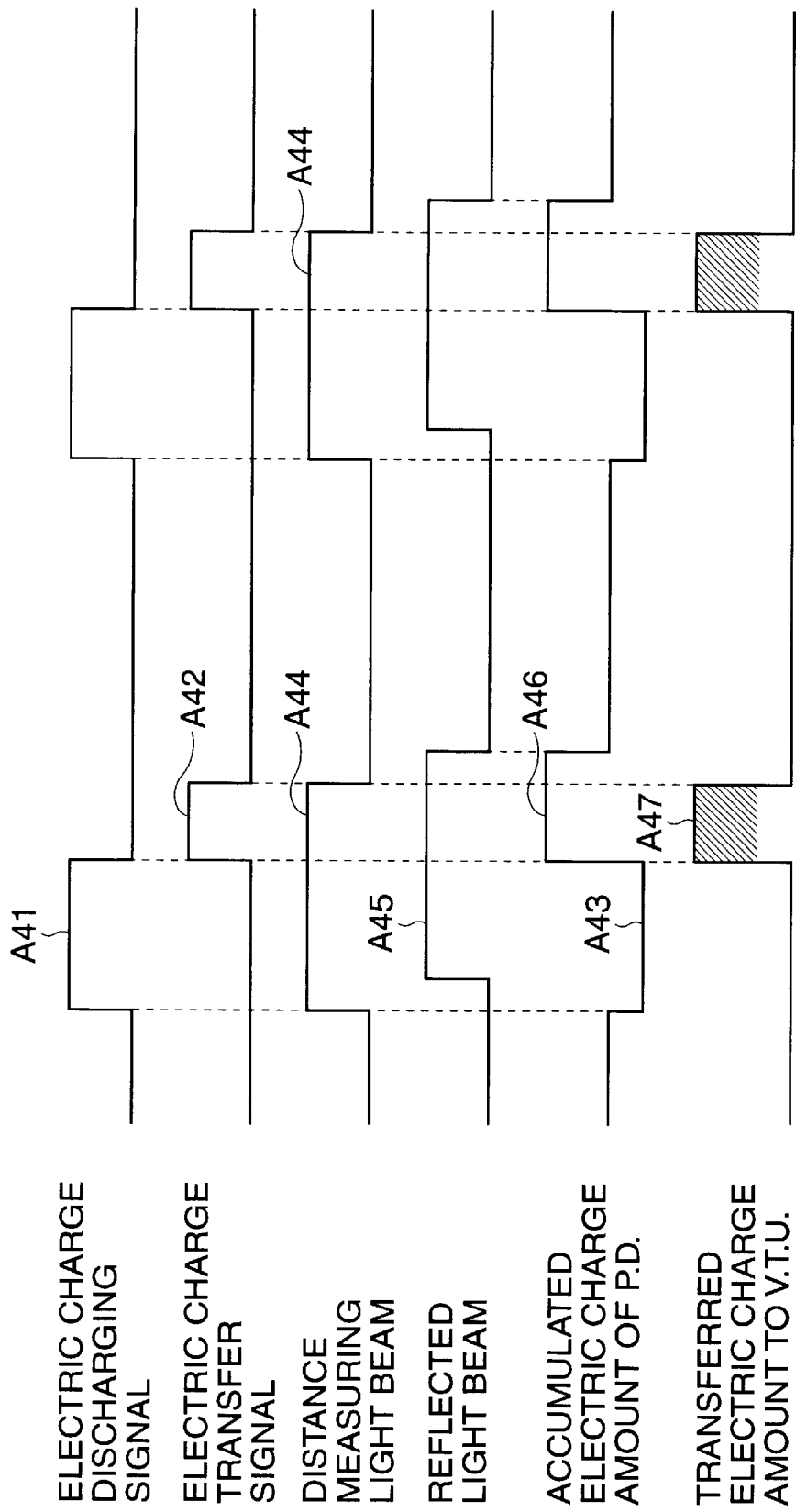
FIG. 12 is a timing chart of an error information sensing operation.

In Steps 123 through 127, an error information sensing operation shown in FIG. 12 is performed. Error information corresponds to electric charge generated in each of the photo-diodes 51 while electric charge is transferred from the photo-diodes 51 to the vertical transfer unit 52. Namely, an error would not occur if a time required to the transfer operation was zero, however it actually takes a predetermined time to perform the transfer operation, and therefore, an error occurs in a sensing operation of a distance from the camera body to the measurement subject. Note that the pulse width of each of the electric charge transfer signals A02, A12, A22, A32 is the same as that of electric charge signals A42 and A52 described later.

In Step 123, a vertical synchronizing signal (not shown) is output, and a distance measuring light beam A44 is intermittently output. In Step 124, a sensing operation control of the CCD 28 is started, and thus an electric charge discharging signal A41 and an electric charge transfer signal A42 are periodically output. The error information sensing operation is performed in such a manner that the end of an output of the electric charge discharging signal A41 and the beginning of an output of the electric charge transfer signal A42 are performed simultaneously, i.e., in such a manner that signal charge A47, generated only in an output period in which the electric charge transfer signal A42 is output, is transferred to the vertical transfer unit 52.

The distance measuring light beam A44 begins to be output at approximately the same time as the beginning of an output of the electric charge discharging signal A41, and is continuously output until the output of the electric charge transfer signal A42 ends. A reflected light beam A45 is received by the photo-diodes 51 after the output of the electric charge discharging signal A41 is started, and disappears after the output of the electric charge transfer signal A42 ends. Therefore, in the photo-diodes 51, after the accumulated electric charge amount becomes zero due to the electric charge discharging signal A41 (reference A43), electric charge A46, based on the reflected light beam A45 and an interference or noise component such as ambient daylight, is accumulated. The accumulated electric charge, which is signal charge A47, is transferred to the vertical transfer unit 52 in accordance with the electric charge transfer signal A42. Namely, the signal charge A47 corresponds to the error information.

In Step 125, it is determined whether one field period has elapsed since the beginning of the error information sensing operation, i.e., whether a new vertical synchronizing signal has been output. When one field period has passed, the process goes to Step 126 in which the signal charge A47 of the error information is output from the CCD 28. The signal charge A47 is then stored in the image memory 34 in Step 127. Then, in Step 128, the distance measuring light beam is turned OFF, and thus the light emitting operation of the light emitting device 14 is stopped.

Thus, in the error information sensing operation, similarly to the distance information sensing operation, the transferring operation of the signal charge A47 to the vertical transfer unit 52 is repeatedly performed until the next vertical synchronizing signal is output, so that the signal charge A47 is integrated in the vertical transfer unit 52.

Figure 13:
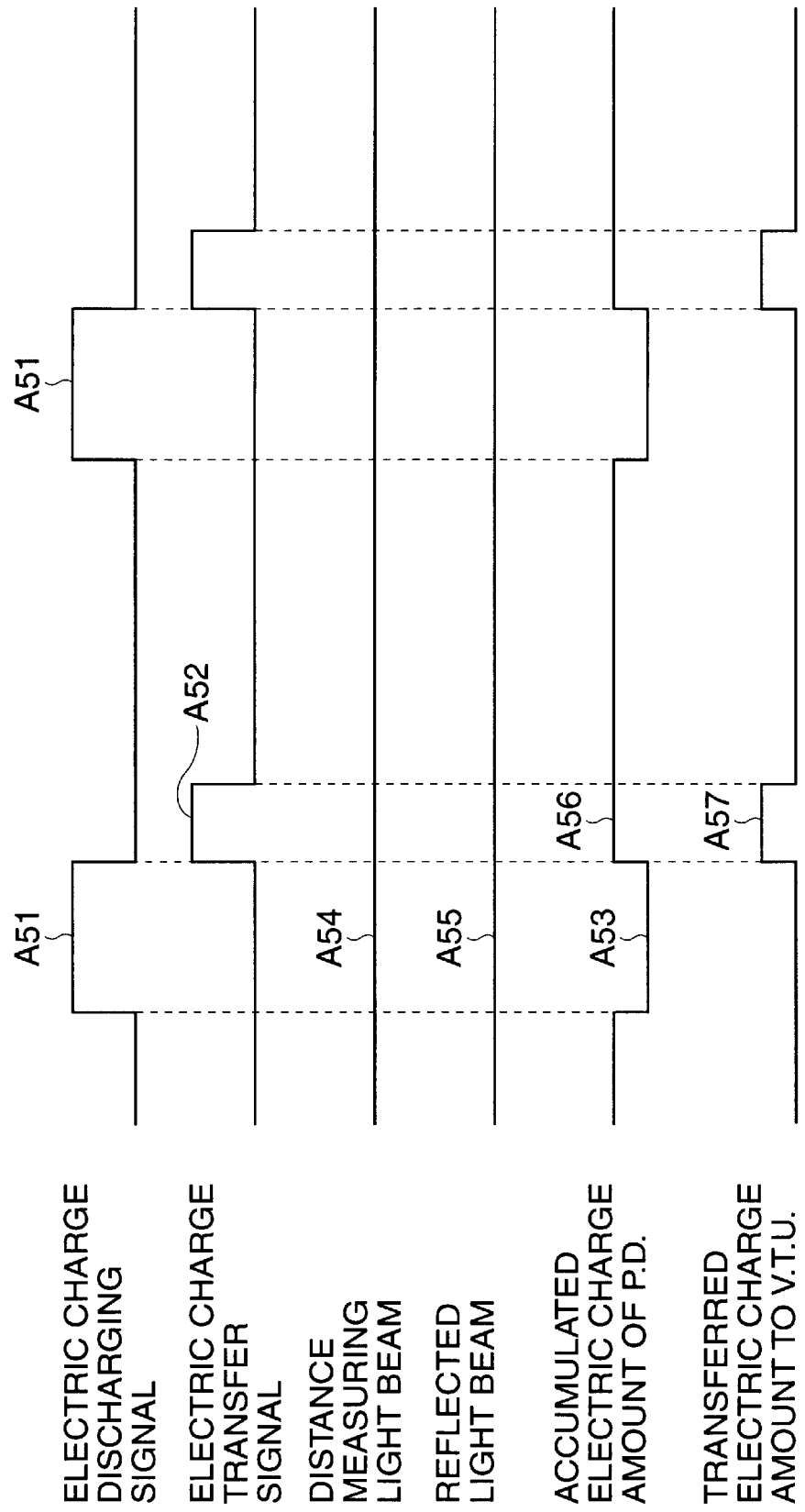
FIG. 13 is a timing chart of an error correction information sensing operation.

In Steps 129 through 132, the error correction information sensing operation shown in FIG. 13 is performed. In Step 129, a vertical synchronizing signal (not shown) is output, and a sensing operation control of the CCD 28 is started. Namely, an electric charge discharging signal A51 and an electric charge transfer signal A52 are periodically output while the light emitting operation of the light emitting device 14 is not carried out. An output timing of each of the electric charge discharging signal A51 and the electric charge transfer signal A52 is the same as that of the error information sensing operation (FIG. 12), and thus, the output of the electric charge transfer signal A52 is started at the same time the output of the electric charge discharging signal A51 ends.

In the error correction information sensing operation, since the distance measuring light beam is not radiated (reference A54), there is no reflected light beam (reference A55). Therefore, in the photo-diodes 51, after the electric charge amount becomes zero due to the electric charge discharging signal A51 (reference A53), although a signal charge of the error information is not generated, an electric charge A56 corresponding to a signal charge corresponding to an interference or noise component, such as ambient daylight, is accumulated. The accumulated electric charge, which is a signal charge A57, is transferred to the vertical transfer unit 52 by the electric charge transfer signal A52. Namely, the signal charge A57 corresponds to error correction information by which an influence, in which the noise component affects the error information, is corrected.

In Step 130, it is determined whether one field period has elapsed since the beginning of the error correction information sensing operation, i.e., whether a new vertical synchronizing signal has been output. When one field period has passed, the process goes to Step 131 in which the signal charge A57 of the error correction information is output from the CCD 28. The signal charge A57 is stored in the image memory 34 in Step 132.

In Step 133, a calculation process of the distance measurement (D) data is performed using the distance information, the distance correction information, the reflectance information, the reflectance correction information, the error information and the error correction information, which are obtained in Steps 103 through 132. The D data is output in Step 134, and the sensing operation ends.

Conversely, when it is determined in Step 102 that the V mode is selected, the distance measuring light beam is turned OFF in Step 141, and a normal photographing operation (i.e., CCD video control) using the CCD 28 is turned ON. Then, the sensing operation ends.

The contents of the calculation executed in Step 133 are described below, with reference to FIGS. 8 through 13.

The signal charge A07 (FIG. 8) sensed by the distance information sensing operation is first distance information corresponding to a distance from the camera body to the measurement subject, and is supposed to be S10. The signal charge A47 (FIG. 12) sensed by the error information sensing operation is error information generated in the photo-diodes 51 in the transfer operation, and is supposed to be S30. By subtracting the error information S30 from the first distance information S10, second distance information, in which the error component contained in the first distance information S10 and based on the transfer operation has been removed, is obtained. Namely, the second distance information corresponds to signal charge shown by reference A10 in FIG. 8.

Although the three-dimensional shape of the measurement subject can be obtained using the second distance information, the second distance information contains an error component caused by an interference or noise component, and other error component caused by a reflectance of a surface of the measurement subject. Therefore, in Step 133, for improving the measurement accuracy of the three-dimensional shape, the distance information is corrected further using the distance correction information, the reflectance information, the reflectance correction information and the error correction information.

Note that, in FIGS. 8, 10 and 12, hatched portions correspond to a difference between the distance information and the distance correction information, a difference between the reflectance information and the reflectance correction information, and a difference between the error information and the error correction information, respectively.

The signal charge A17 (FIG. 9) sensed by the distance correction information sensing operation, i.e. the distance correction information sensed by the same process as that of the first distance information S10, with the light emitting device 14 being turned OFF, is supposed to be S11. The signal charge A27 (FIG. 10) sensed by the reflectance information sensing operation, i.e. the reflectance information depending upon the reflectance of the measurement subject is supposed to be S20. The signal charge A37 (FIG. 11) sensed by the reflectance correction information sensing operation, i.e. the reflectance correction information sensed by the same process as that of the reflectance information sensing operation, with the light emitting device 14 being turned OFF, is supposed to be S21. The signal charge A57 (FIG. 13) sensed by the error correction information sensing operation, i.e. the error correction information sensed by the same process as that of the error information sensing operation, with the light emitting device 14 being turned OFF, is supposed to be S31. Third distance information SD is obtained by the following formula, based on the information S10, S11, S20, S21, S30 and S31.

$$SD=(S10-S11-(S30-S31))/(S20-S21-(S30-S31))$$

The third distance information SD is obtained by dividing a first value, in which the first error component derived from a noise and a transfer operation is subtracted from the first distance information S10, by a second value, in which the second error component derived from a noise and a transfer operation is subtracted from the reflectance information S20.

Thus, based on the formula above described, the distance information from the camera body to each point on the surface of the measurement subject is corrected, so that an accuracy of a distance sensing is improved.

As described above, according to the embodiment, since an optical shutter need not be provided, the three-dimensional image capturing device can be miniaturized and manufactured at a low cost. Further, the embodiment is constructed in such a manner that a plurality of electric charge discharging signals (pulse signals) are output to integrate the signal charge A07 so that distances, from the camera body to the measurement subject, are sensed concurrently. Therefore, an output signal of the three-dimensional image capturing device can have a higher level, in comparison with a conventional device, and distance information, which does not contain noise and has a high accuracy, can be sensed.

Furthermore, according to the embodiment, the distance information, which is three-dimensional image data regarding the topography of the measurement subject, is detected and accumulated concurrently without a need for scanning the distance measuring light beam over the measurement subject. Accordingly, a time over which the three-dimensional image of the measurement subject is obtained can be drastically shortened.

The reflected light beam, sensed by the CCD 28 may be affected by a reflectance of the surface of the measurement subject. Therefore, the distance information, obtained through the reflected light beam, may contain an error resulting from the reflectance. Further, the reflected light beam sensed by the CCD 28 may contain an extra component, such as ambient daylight, being other than the reflected light beam from the measurement subject, which can cause an error. Furthermore, the distance information may contain an error resulting from electric charge generated in the photo-diodes 51 during the transfer operation. However, according to the embodiment, such errors become correctable, so that three-dimensional image data regarding the topography of the measurement subject is detected with a high accuracy.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-105450 (filed on Apr. 13, 1999) which is expressly incorporated herein, by reference, in its entirety.

What is claimed is:

1. A three-dimensional image capturing device, comprising:
    a light source that radiates a distance measuring light beam irradiating a measurement subject, said measurement subject reflecting said distance measuring light beam to generate a reflected light beam;
    a plurality of photoelectric conversion elements that receive said reflected light beam, so that an electric charge corresponding to an amount of said received reflected light beam is accumulated in each of said photoelectric conversion elements;
    a signal charge holding unit disposed adjacent to each of said photoelectric conversion elements;
    an electric charge discharging processor that discharges an unwanted charge accumulated in each of said photoelectric conversion elements, so that an accumulating operation of signal charge is started in each of said photoelectric conversion elements;
    a signal charge transfer processor that transfers said signal charge accumulated in said photoelectric conversion elements to said signal charge holding unit;
    a distance information sensing processor that controls said light source, said electric charge discharging processor and said signal charge transfer processor in such a manner that said plurality of photoelectric conversion elements receive said reflected light beam after a completion of a first discharging operation of said electric charge discharging processor, and controls a transfer operation of said signal charge transfer processor, so that said signal charge is integrated in said signal charge holding unit to sense first distance information corresponding to a distance to said measurement subject;

an error information sensing processor that additionally controls said light source, said electric charge discharging processor and said signal charge transfer processor in such a manner that said plurality of photoelectric conversion elements start to receive said reflected light beam before a completion of a second discharging operation of said electric charge discharging processor, and controls a transfer operation of said signal charge transfer processor, so that said signal charge is integrated in said signal charge holding unit to sense error information generated in said plurality of photoelectric conversion elements during said transfer operation; and a distance information calculation processor that subtracts said error information from said first distance information to obtain second distance information indicating said distance to said measurement subject, wherein said distance information sensing processor controls said light source, said electric charge discharging processor and said signal charge transfer processor in such a manner that said transfer operation is completed by the time said reflected light beam disappears, so that said signal charge is integrated in said signal charge holding unit, and said error information sensing processor controls said light source, said electric charge discharging processor and said signal charge transfer processor in such a manner that said transfer operation is completed by the time said reflected light beam disappears, so that said signal charge is integrated in said signal charge holding unit.

2. The device according to claim 1, wherein said photoelectric conversion elements are formed on a substrate, and said electric charge discharging processor discharges said unwanted charge to said substrate.

3. The device according to claim 1, wherein said signal charge holding unit is provided in a vertical transfer unit that outputs said signal charge from said three-dimensional image capturing device.

4. The device according to claim 1, wherein said plurality of photoelectric conversion elements and said signal charge holding units are formed as a vertical overflow drain type of interline CCD.

5. The device according to claim 1, wherein an electric charge discharge signal, output by said electric charge discharging processor, to discharge said unwanted charge, and a signal charge transfer signal, output by said signal charge transfer processor, to transfer said signal charge to said signal charge holding unit, are pulse signals.

6. A three-dimensional image capturing device, comprising:

a light source that radiates a distance measuring light beam irradiating a measurement subject, said measurement subject reflecting said distance measuring light beam to generate a reflected light beam;

a plurality of photoelectric conversion elements that receive said reflected light beam, so that an electric charge corresponding to an amount of said received reflected light beam is accumulated in each of said photoelectric conversion elements;

a signal charge holding unit disposed adjacent to each of said photoelectric conversion elements;

an electric charge discharging processor that discharges an unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit;

a distance information sensing processor that controls said light source, said electric charge discharging processor and said signal charge transfer processor in such a manner that said plurality of photoelectric conversion elements receive said reflected light beam after a completion of a first discharging operation of said electric charge discharging processor, and controls a transfer operation of said signal charge transfer processor, so that said signal charge is integrated in said signal charge holding unit to sense first distance information corresponding to a distance to said measurement subject;

an error information sensing processor that additionally controls said light source, said electric charge discharging processor and said signal charge transfer processor in such a manner that said plurality of photoelectric conversion elements start to receive said reflected light beam before a completion of a second discharging operation of said electric charge discharging processor, and controls a transfer operation of said signal charge transfer processor, so that said signal charge is integrated in said signal charge holding unit to sense error information generated in said plurality of photoelectric conversion elements during said transfer operation; and a distance information calculation processor that subtracts said error information from said first distance information to obtain second distance information indicating said distance to said measurement subject, wherein said error information sensing processor controls said light source, said electric charge discharging processor and said signal charge transfer processor in such a manner that said transfer operation is started approximately at the same time as the completion of said second discharging operation.

7. The device of claim 6, wherein said photoelectric conversion elements are formed on a substrate, and said electric charge discharging processor discharges said unwanted charge to said substrate.

8. A three-dimensional image capturing device, comprising:

a light source that radiates a distance measuring light beam irradiating a measurement subject, said measurement subject reflecting said distance measuring light beam to generate a reflected light beam;

a plurality of photoelectric conversion elements that receive said reflected light beam, so that an electric charge corresponding to an amount of said received reflected light beam is accumulated in each of said photoelectric conversion elements;

a signal charge holding unit disposed adjacent to each of said photoelectric conversion elements;

an electric charge discharging processor that discharges an unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit;

a distance information sensing processor that controls said light source, said electric charge discharging processor and said signal charge transfer processor in such a manner that said plurality of photoelectric conversion elements receive said reflected light beam after a completion of a first discharging operation of said electric charge discharging processor, and controls a transfer operation of said signal charge transfer processor, so that said signal charge is integrated in said signal charge holding unit to sense first distance information corresponding to a distance to said measurement subject;

an error information sensing processor that additionally controls said light source, said electric charge discharging processor and said signal charge transfer processor in such a manner that said plurality of photoelectric conversion elements start to receive said reflected light beam before a completion of a second discharging operation of said electric charge discharging processor, and controls a transfer operation of said signal charge transfer processor, so that said signal charge is integrated in said signal charge holding unit to sense error information generated in said plurality of photoelectric conversion elements during said transfer operation; and a distance information calculation processor that subtracts said error information from said first distance information to obtain second distance information indicating said distance to said measurement subject, wherein a third distance information SD is obtained by the following formula, $$SD=(S10-S11-(S30-S31))/(S20-S21-(S30-S31))$$

wherein said first distance information sensed by said distance information sensing processor is $S10$, distance correction information, sensed by the same processing as that of said first distance information while said light source is turned OFF, is $S11$, reflectance information, sensed by an operation in which said plurality of photoelectric conversion elements receive all of said reflected light beam from the completion of another discharging operation to the completion of said transfer operation, and dependent on a reflectance of said measurement subject, is $S20$, reflectance correction information, sensed by the same processing as that of said reflectance information while said light source is turned OFF, is $S21$, said error information sensed by said error information sensing processor is $S30$, and error correction information sensed while said light source is turned OFF is $S31$.

* * * * *